US 8,423,888 B2

(12) United States Patent
Odagiri et al.

(10) Patent No.: US 8,423,888 B2
(45) Date of Patent: Apr. 16, 2013

(54) DOCUMENT CONVERSION AND USE SYSTEM

(75) Inventors: Junichi Odagiri, Kawasaki (JP); Satoshi Nakashima, Kawasaki (JP); Shigeru Yoshida, Kawasaki (JP); Takuroh Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1258 days.

(21) Appl. No.: 11/905,312

(22) Filed: Sep. 28, 2007

(65) Prior Publication Data

US 2008/0098299 A1 Apr. 24, 2008

Related U.S. Application Data

(63) Continuation of application No. PCT/JP2005/006070, filed on Mar. 30, 2005.

(51) Int. Cl.
G06F 17/00 (2006.01)
(52) U.S. Cl.
USPC ........................................ 715/239; 715/241
(58) Field of Classification Search .................. 715/239, 715/241
See application file for complete search history.

(56) References Cited

U.S. PATENT DOCUMENTS

| 7,194,680 | B1* | 3/2007 | Roy et al. ..................... 715/205 |
| 7,380,204 | B2* | 5/2008 | Lomelin-Stoupignan et al. ........................ 715/234 |
| 8,086,959 | B2* | 12/2011 | Rothschiller et al. ......... 715/255 |
| 2002/0038319 | A1* | 3/2002 | Yahagi ........................... 707/513 |
| 2003/0001893 | A1* | 1/2003 | Haley ............................ 345/762 |
| 2003/0159110 | A1* | 8/2003 | Numata et al. ................ 715/513 |
| 2003/0212698 | A1* | 11/2003 | Mani et al. ..................... 707/102 |
| 2003/0237046 | A1* | 12/2003 | Parker et al. .................. 715/513 |
| 2004/0010753 | A1* | 1/2004 | Salter et al. ................... 715/513 |

(Continued)

FOREIGN PATENT DOCUMENTS

| JP | 2000-242641 | 9/2000 |
| JP | 2003-67403 | 3/2003 |
| JP | 2005-234837 | 9/2005 |
| WO | WO 2006103777 A1 * | 10/2006 |

OTHER PUBLICATIONS

"Stylesheets That Generate HTML" from Stylus Studio v. 6.0 online product documentation. Jan. 2005, Progress Software Corporation. Retrieved Feb. 25, 2011 from <http://www.stylusstudio.com/docs/v60/>.*

"Authentic View" from XMLSpy 2005 Professional Edition manual. Mar. 9, 2005, Altova. Retrieved Feb. 25, 2011 from <http://www.altova.com/download_archive.html>.*

(Continued)

*Primary Examiner* — Cesar Paula
*Assistant Examiner* — Tyler J Schallhorn
(74) *Attorney, Agent, or Firm* — Fujitsu Patent Center

(57) ABSTRACT

A document conversion and use system which converts a first structured document into a second structured document different in structure from the first structured document, comprising: a template storage unit storing a template indicating the structure of the second structured document; a structure specification unit for reading out the template from the template storage unit and causing a user to specify an element or an element content constituting the template; a correspondence definition specification unit for causing the user to define the correspondence definition specification indicating the correspondence between the element in the first structured document and the element in the template; and an unit for analyzing the template structure to specify the element or the element content specified by the structure specification unit, searching for the element defined by the correspondence definition starting from the element or the element content, and performing conversion processing according to the search result.

14 Claims, 27 Drawing Sheets

U.S. PATENT DOCUMENTS

| | | | |
|---|---|---|---|
| 2004/0060003 A1* | 3/2004 | Mani et al. | 715/513 |
| 2004/0060004 A1* | 3/2004 | Mani et al. | 715/513 |
| 2004/0172592 A1* | 9/2004 | Collie et al. | 715/503 |
| 2004/0172616 A1* | 9/2004 | Rothschiller et al. | 717/114 |
| 2004/0205571 A1* | 10/2004 | Adler et al. | 715/513 |
| 2005/0187899 A1* | 8/2005 | Odagiri et al. | 707/1 |
| 2006/0095456 A1* | 5/2006 | Sakai et al. | 707/101 |
| 2007/0282616 A1* | 12/2007 | Brunswig et al. | 705/1 |

OTHER PUBLICATIONS

Sekiya Yamashita, "Establishing a Business System using PHP and PostgreSQL", pp. 212-219, First Edition, Nippon Jitsugyo Publishing, Dec. 20, 2003.

Japanese Office Action issued on Dec. 9, 2008 in corresponding Japanese Patent Application 2007-510285.

* cited by examiner

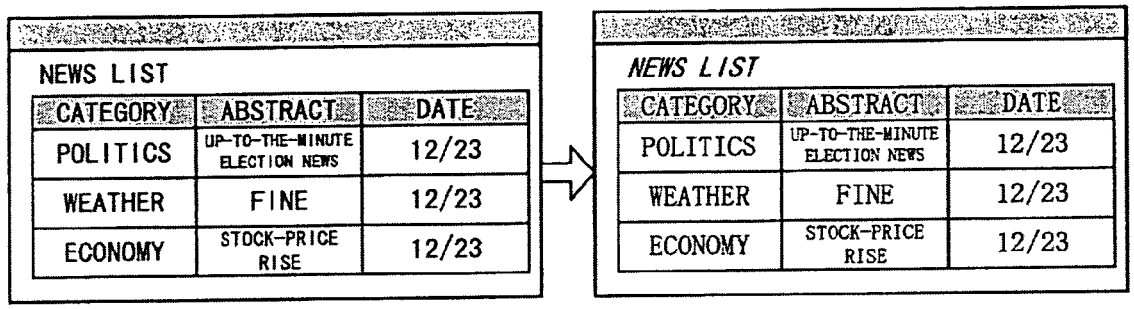
F I G. 2

```
<?xml encoding="UTF-8"?>
<NEWS LIST>
   <NEWS>
   <CATEGORY> POLITICS </CATEGORY>         ─ 31
      <ABSTRACT> UP-TO-THE-MINUTE ELECTION NEWS </ABSTRACT>
      <DATE> 12/23 </DATE>
   </NEWS>
   <NEWS>
      <CATEGORY> WEATHER </CATEGORY>
      <ABSTRACT> FINE </ABSTRACT>
      <DATE> 12/23 </DATE>
         ELEMENT   ELEMENT CONTENT
   </NEWS>
   ...
</NEWS LIST>
```

F I G. 3

```
<NEWS LIST>
  <NEWS>
    <CATEGORY> POLITICS </CATEGORY>
    <ABSTRACT> UP-TO-THE-MINUTE ELECTION NEWS </ABSTRACT>
    <DATE> 12/23 </DATE>
  </NEWS>
  <NEWS>
    <CATEGORY> WEATHER </CATEGORY>
    <ABSTRACT> FINE </ABSTRACT>
    <DATE> 12/23 </DATE>
  </NEWS>
...
</NEWS LIST>
```

FIG. 13

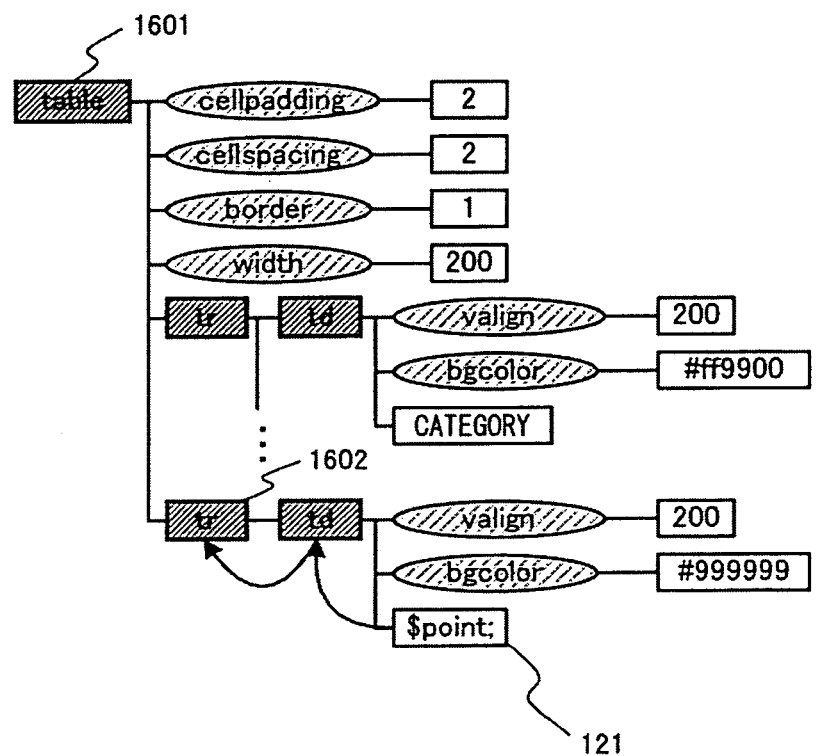
F I G. 16

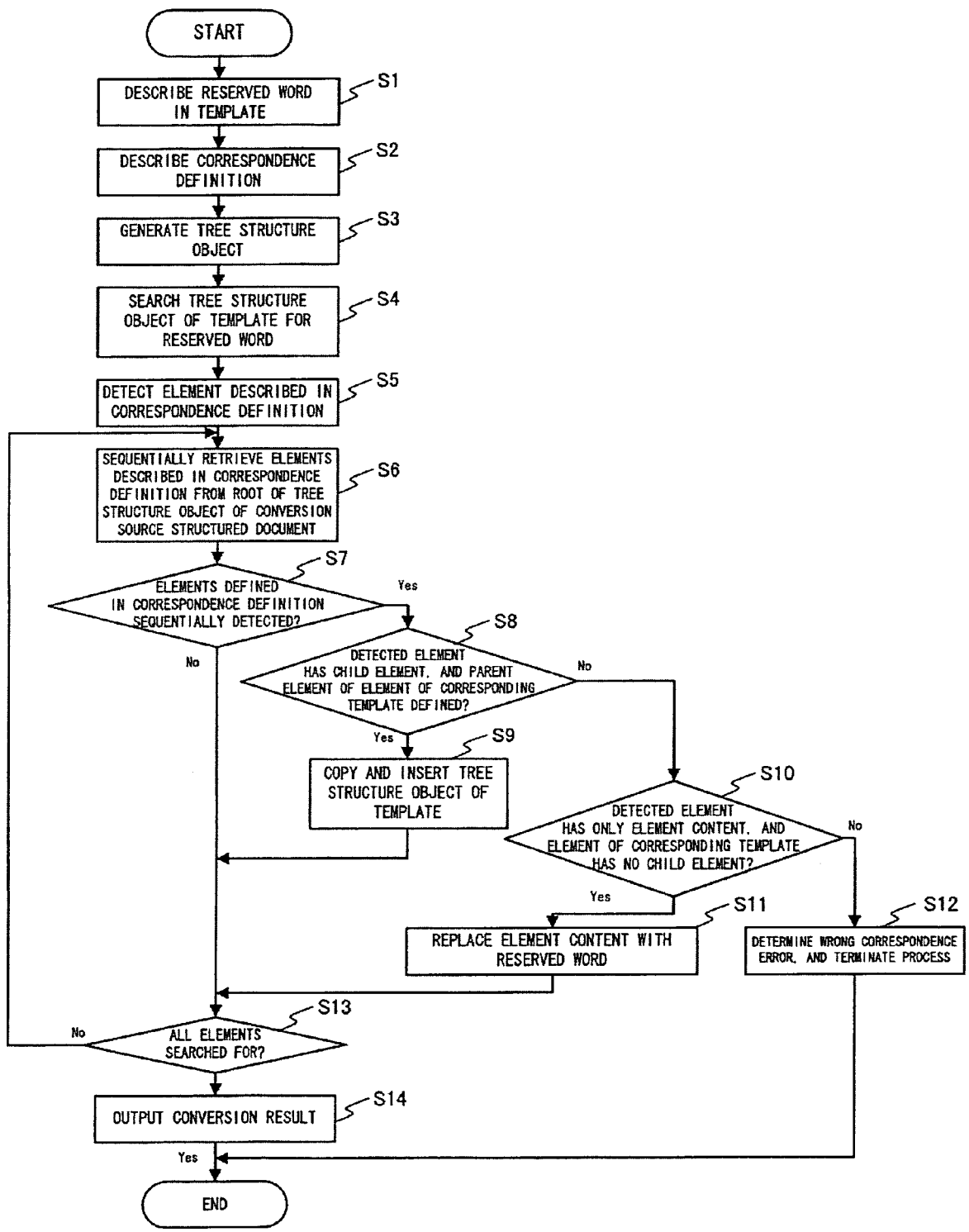
F I G. 17

```
<?xml encoding="UTF-8"?>
<NEWS LIST>
  <POLITICS>
    <ABSTRACT> UP-TO-THE-MINUTE ELECTION NEWS (12/23) </ABSTRACT>
    <ABSTRACT> RESULT OF ELECTION (12/24) </ABSTRACT>
  </POLITICS>
  ...
  <WEATHER>
    <OUTLINE> FINE (12/23) </OUTLINE>
    <OUTLINE> CLOUDY (12/24) </OUTLINE>
  </WEATHER>
...
</NEWS LIST>
```

FIG. 18

```
<html>
 <head></head>
 <body>
NEWS LIST
   POLITICS
   <ul>
    <li>ID1</li>
   </ul>           ⎫
   WEATHER         ⎬ 1901
   <ul>
    <li>ID2</li>
   </ul>           ⎫
   </body>         ⎬ 1902
</html>
```

F I G. 1 9

```
li = ABSTRACT;
```

FIG. 20

```
li = OUTLINE;
```

FIG. 21

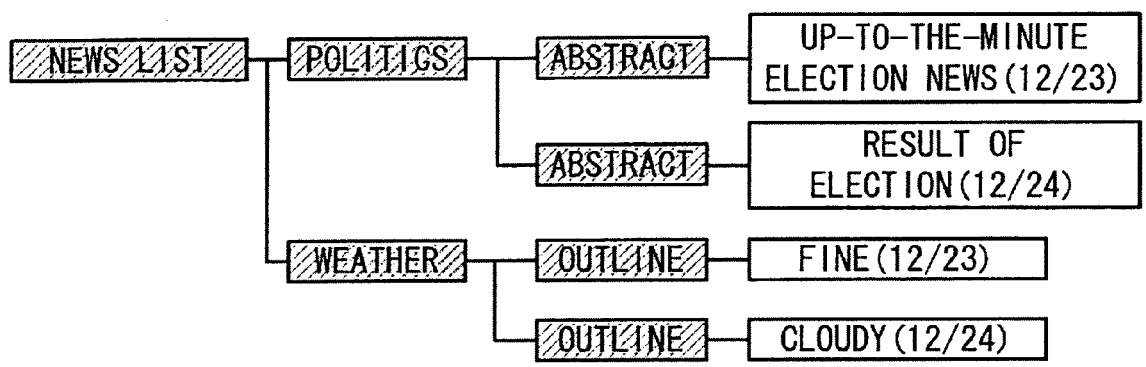
F I G. 2 3

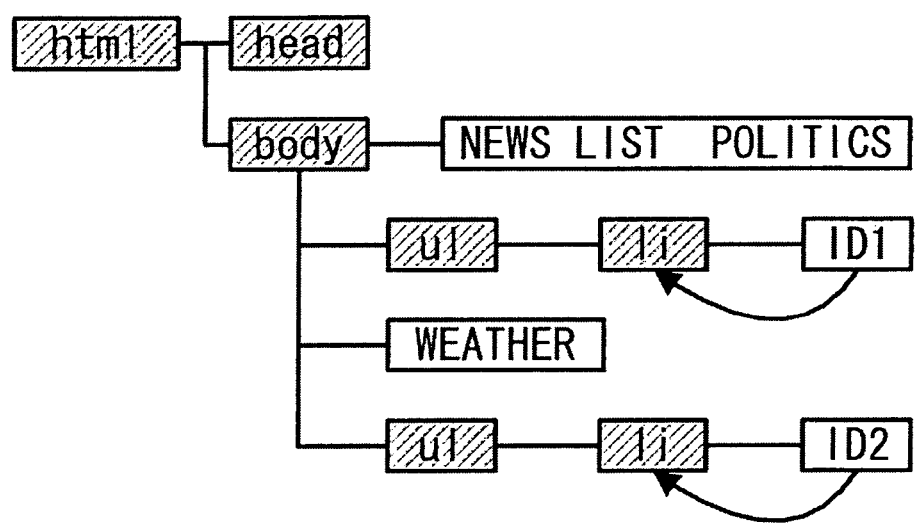
F I G. 2 4

DOCUMENT CONVERSION AND USE SYSTEM

CROSS-REFERENCE TO RELATED APPLICATION

This application is a continuation of international PCT application No. PCT/JP2005/006070 filed on Mar. 30, 2005.

BACKGROUND OF THE INVENTION

1. Field of the Invention

The present invention relates to a structured document processing and converting system for converting a structured document generated by an SGML (Standard Generated Markup Language), an XML (eXtensible Markup Language), an HTML (Hypertext Markup Language), etc. into a structured document having another structure.

2. Description of the Related Art

With drastic progress of the Internet, there are an increasing number of events in which data on the Internet is described in a structured document because once the structured document is described in the structured document, it can be easily changed and extended later. For example, in the Web contents on the Internet, there are some sites such as the site of the press etc. that continue publishing the latest data and information. To constantly and continuously publish the latest Web contents, it is necessary to easily update the Web contents.

The Web contents are mainly configured by data and styles. The data and the styles are rarely updated simultaneously, and normally updated separately. For example, FIG. 1 shows an example of updating only data, that is, only the data indicating the contents of the items of the abstract and the date is updated. FIG. 2 shows an example of updating only the style, and the font for use on the display is changed without changing the contents of the display of each item.

The definition of the data and the style is performed using a structured document. FIG. 3 shows an example of a structured document. The structured document is configured by a plurality of elements, and each element is formed by an item name (tag) and element content (data).

At present, in the structured documents, an XML is used in defining data, and an HTML is especially used in defining a style.

The present application is to process and analyze the tag and data in the structured document, and pass a part of them to the user application. The user application aims at offering various services by performing data processing on the basis of a received document.

Since data and a style are stored together in the HTML, it is hard to separately manage the data and the style in the HTML. Therefore, to flexibly represent data in the XML and separately define a style is proposed by prior art.

(1) Prior Art 1: HTML Conversion Using an XSLT

FIG. 4 shows the outline of the prior art 1.

In the system according to the prior art 1, a style sheet (XSL) extensible style sheet language) 43 for conversion of an XML document 41 is generated.

In FIG. 4, the XML document 41 is converted into an HTML document 44 by a conversion engine (XSLT: XML Stylesheet Language Transformations) 42 on the basis of the style sheet 43 described in the XSL.

In this system, once a style is defined, the document can be automatically converted into the HTML document although the data in the XML document 41 is changed.

(2) Prior Art 2 (Japanese Patent Application No. 2004-042289)

FIG. 5 shows the outline of the prior art 2. The prior art 2 has been proposed by applicant of the present invention to solve the problems of the systems such as the patent document 1 etc. in which the data structure of a structured document is managed by dividing the structure of the document into subtrees, the attribute of each element and the element content are managed as position information, a document is extracted according to the position information, and the extracted data is assigned directly to a document converting template, thereby reducing the load of a CPU.

In the system of the prior art 2, a document converting template 54 is extracted from a prepared HTML design. Only a tag defined by a one-to-one correspondence definition 53 is extracted from an XML document 51, and the extracted data is specified and embedded in the document converting template 54.

In this system, since the HTML design can be used as is, it is not necessary to perform XSLT programming.

FIG. 6 shows the demerit of the system of the prior art 1.

In the system according to the prior art 1, an HTML design 62 is generated by an HTML editor 61, and an XSLT tag is embedded in the HTML design 62, thereby programming 63 s XSL style sheet 64 on the basis of the XML. As a result, when the HTML editor 61 cannot be directly used in changing the design. Therefore, since a display style cannot be directly watched on the HTML editor 61 although a changing process is to be performed while checking the display style, it takes some time to perform the process. Furthermore, since the style cannot be changed while the process is confirmed by the HTML editor, it is very difficult to update the style. In addition, the XSL style sheet 64 has to be manually generated, there arises the problem of reusability when a design change is to be made.

FIG. 7 shows the disadvantage of the system of the prior art 2.

In the system of the prior art 2, when there is a repetitive portion of listing etc. in the HTML design, the portion is to be extracted as is as a template from the HTML design or reprocessed, the reusability of the HTML design is very poor.

With the above-mentioned problems taken into account, the present invention aims at providing a document conversion and use system capable of using the design generated on the HTML editor.

The present invention also aims at providing a document conversion and use system capable of visually editing a template displayed on the HTML editor.

The present invention further aims at providing a document conversion and use system capable of automatically converting a document, while it is being edited, by specifying an element content without generating the XSLT as in the conventional system or extracting data from the HTML design.

Also the present invention aims at providing a document conversion and use system having high reusability although a document includes a repetitive structure such as a table, a list, etc.

Patent Document 1: Japanese Published Patent Application No. 2003-67403

SUMMARY OF THE INVENTION

The document conversion and use system according to the present invention converts a first structured document into a second structured document having a structure different from that of the first structured document. To solve the above-mentioned problem, it includes a template storage unit, a structure specification unit, a correspondence definition specification unit, and a conversion processing unit.

The template storage unit stores in the second structured document a template indicating the structure after conversion.

The structure specification unit reads the template from the template storage unit, and allows a user to specify the element or element content that forms the template.

The correspondence definition specification unit allows the user to define the correspondence definition indicating the correspondence between the element of the first structured document and the element in the template.

The conversion processing unit designates the element or element content specified by the structure specification unit by analyzing the structure of the template, searches the element defined by the correspondence definition using the element or element content as a start point, and performs a conversion processing on the basis of a result of the search.

With the above-mentioned configuration, when the first structured document is converted into the second structured document, the data structure after conversion is separately generated using a template, and the conversion is performed almost without processing the template, thereby separately managing data and design for reusability.

The structure specification unit can be configured to display the template read from the template storage unit, and allow the user to specify on the display screen an element or element content that configures the template. The specification is performed by, for example, the user inputting a reserved word on the display screen.

With the configuration, the user can visually specify the data while displaying the template.

Furthermore, a search unit can be further included to convert the template into a tree structure object, and search an element or element content specified by the user from the tree structure object through the structure specification unit. The search unit can also be designed to search a structure in the direction of a parent element from the position of the element or element content specified by the structure specification unit.

The component detected with the configuration can be uniquely determined.

The conversion processing unit can also be configured to enter the element content in the template together with the element of the template associated by the correspondence definition when the element of the first structured document defined by the correspondence definition has only the element content as a child element, and to enter in the template the elements of the template corresponding to the child elements when the element of the first structured document defined by the correspondence definition has data other than element content as a child element.

With the configuration, a case in which a list and a repetitive structure are included can be appropriate processed.

The present invention is not limited to a document conversion and use system, but includes as an appropriate scope a document converting method, its program, and portable storage medium.

BRIEF DESCRIPTION OF THE DRAWINGS

FIG. 2 shows an example of updating only the style of the Web contents;
FIG. 3 shows an example of a structured document;
FIG. 13 shows an example of a conversion source structured document;
FIG. 16 shows an example of a tree structure object of a template according to the first embodiment;
FIG. 17 is a flowchart of the process by the conversion engine according to the first embodiment;
FIG. 18 shows a conversion source structured document converted according to the second embodiment;
FIG. 19 shows a template for use in the second embodiment;
FIG. 20 shows the correspondence definition of "ID1";
FIG. 21 shows the correspondence definition of "ID2";
FIG. 23 shows a tree structure object of a conversion source structured document according to the second embodiment;
FIG. 24 shows a tree structure object of a template according to the second embodiment.

DETAILED DESCRIPTION OF THE EMBODIMENTS

A mode for embodying the present invention is described below by referring to the attached drawings.

First, the abstract of the present embodiment is described.

Figure 1:
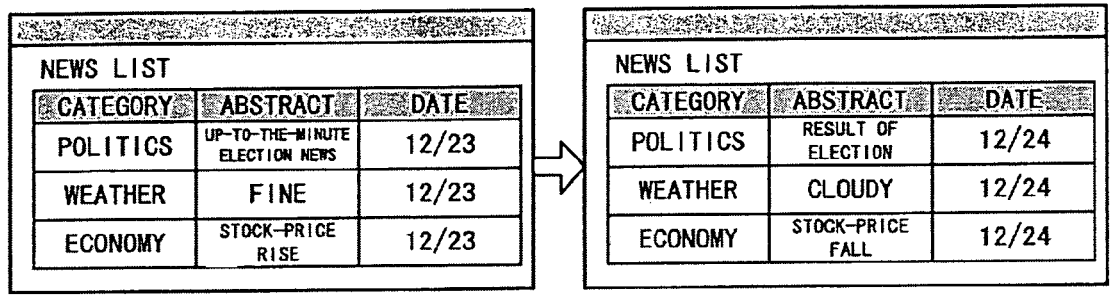
FIG. 1 shows an example of updating only the data of the Web contents.
Figure 4:
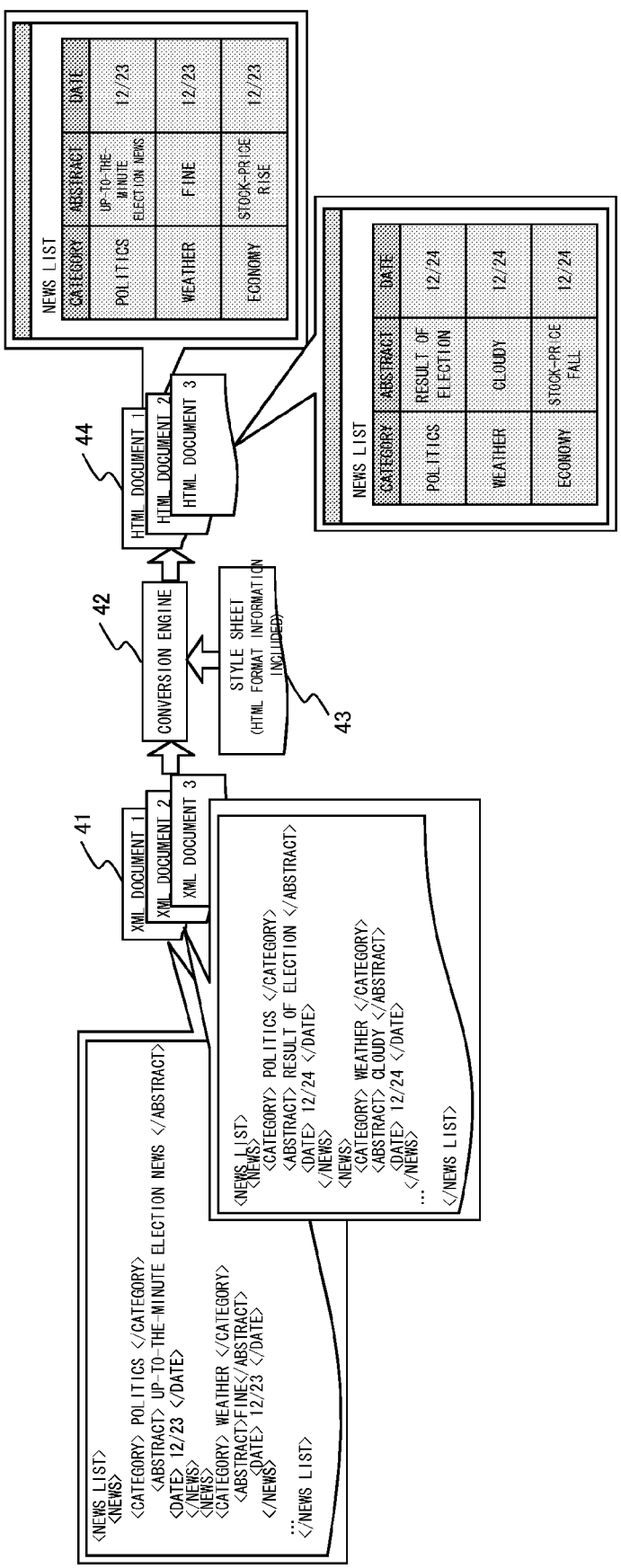
FIG. 4 shows the abstract of the prior art 1.
Figure 5:
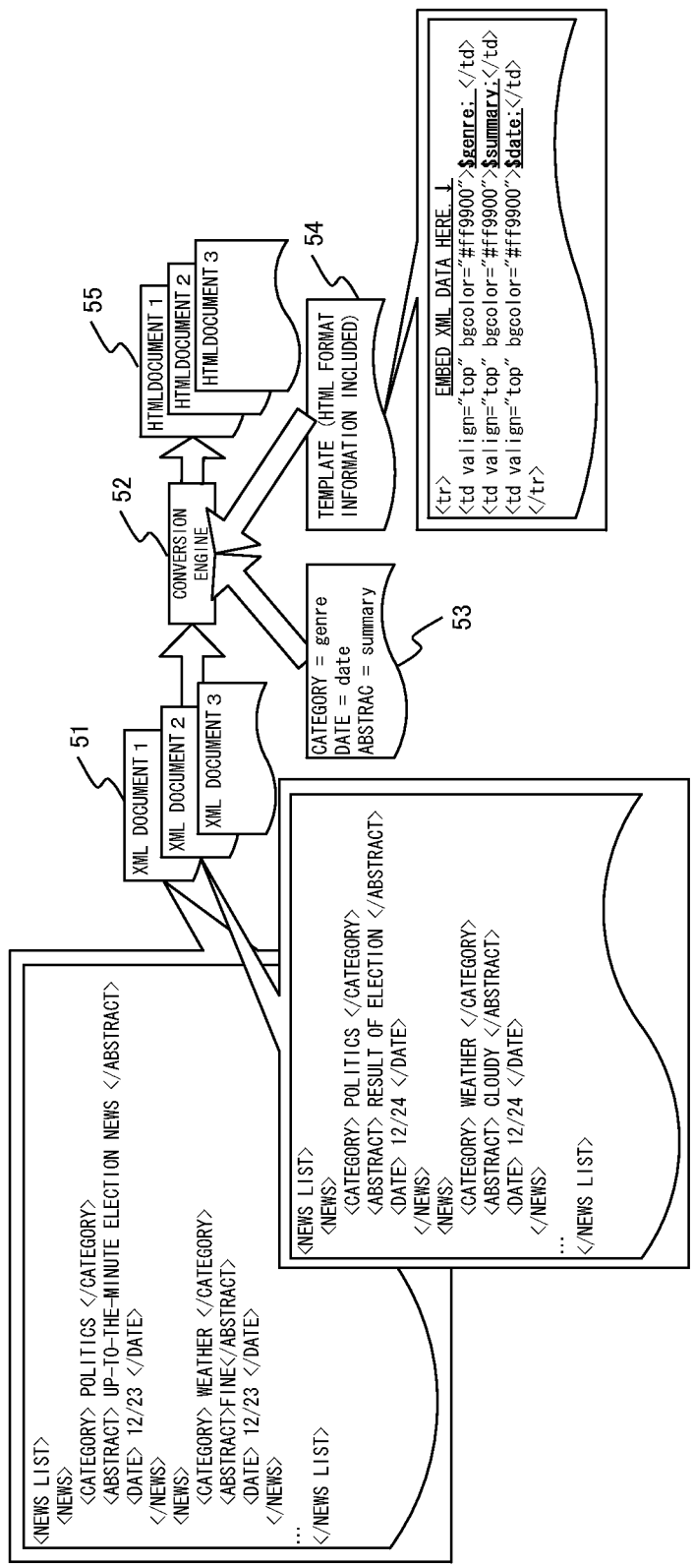
FIG. 5 shows the abstract of the prior art 2.
Figure 6:
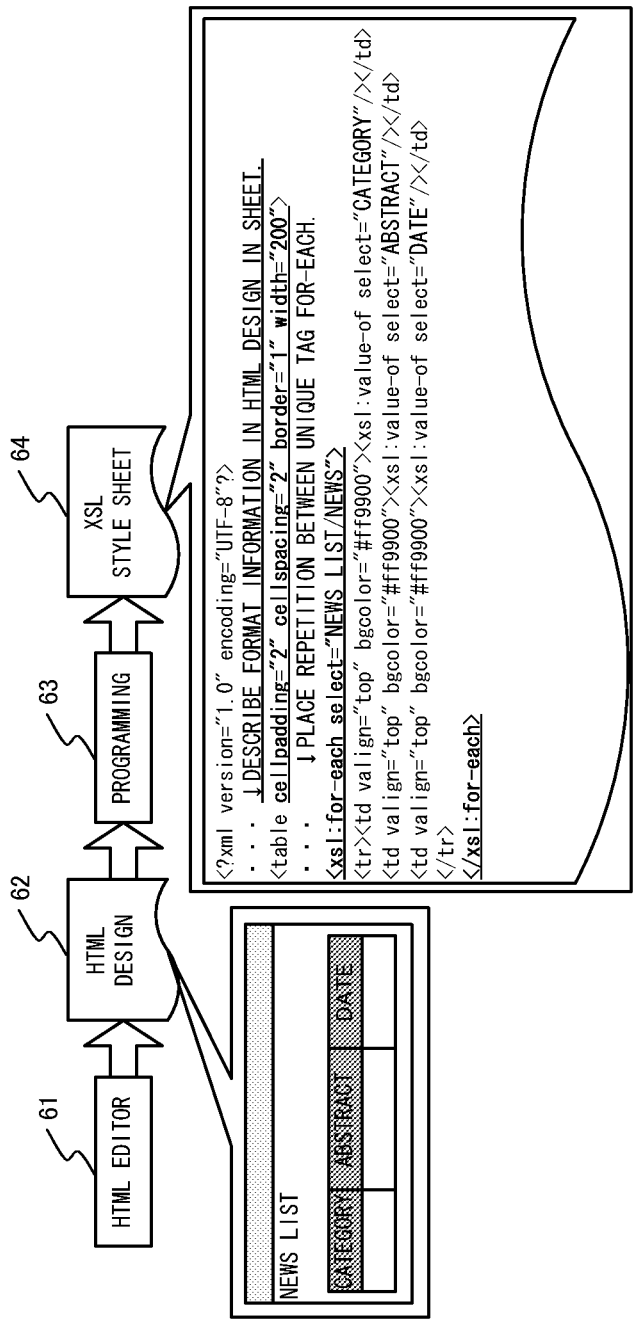
FIG. 6 shows the defect of the system according to the prior art 1.
Figure 7:
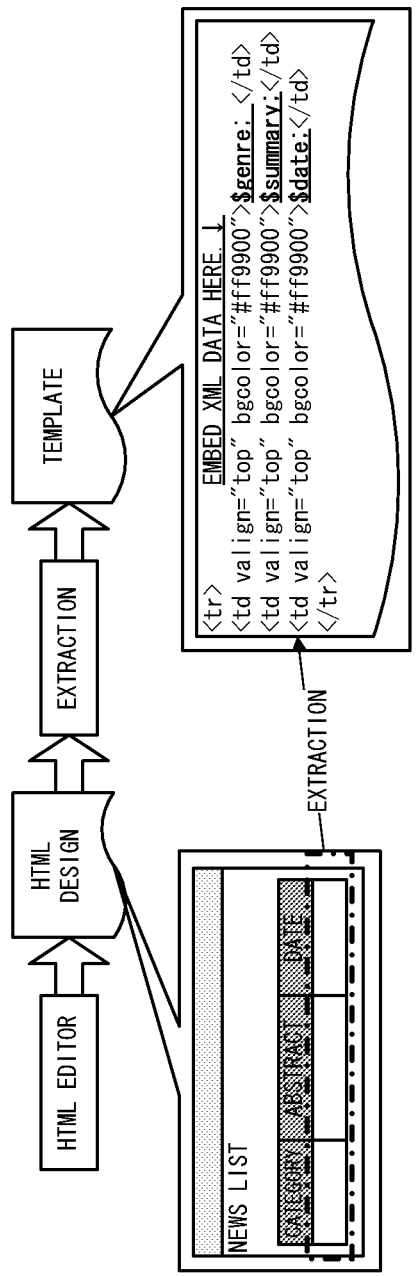
FIG. 7 shows the defect of the system according to the prior art 2.
Figure 8:
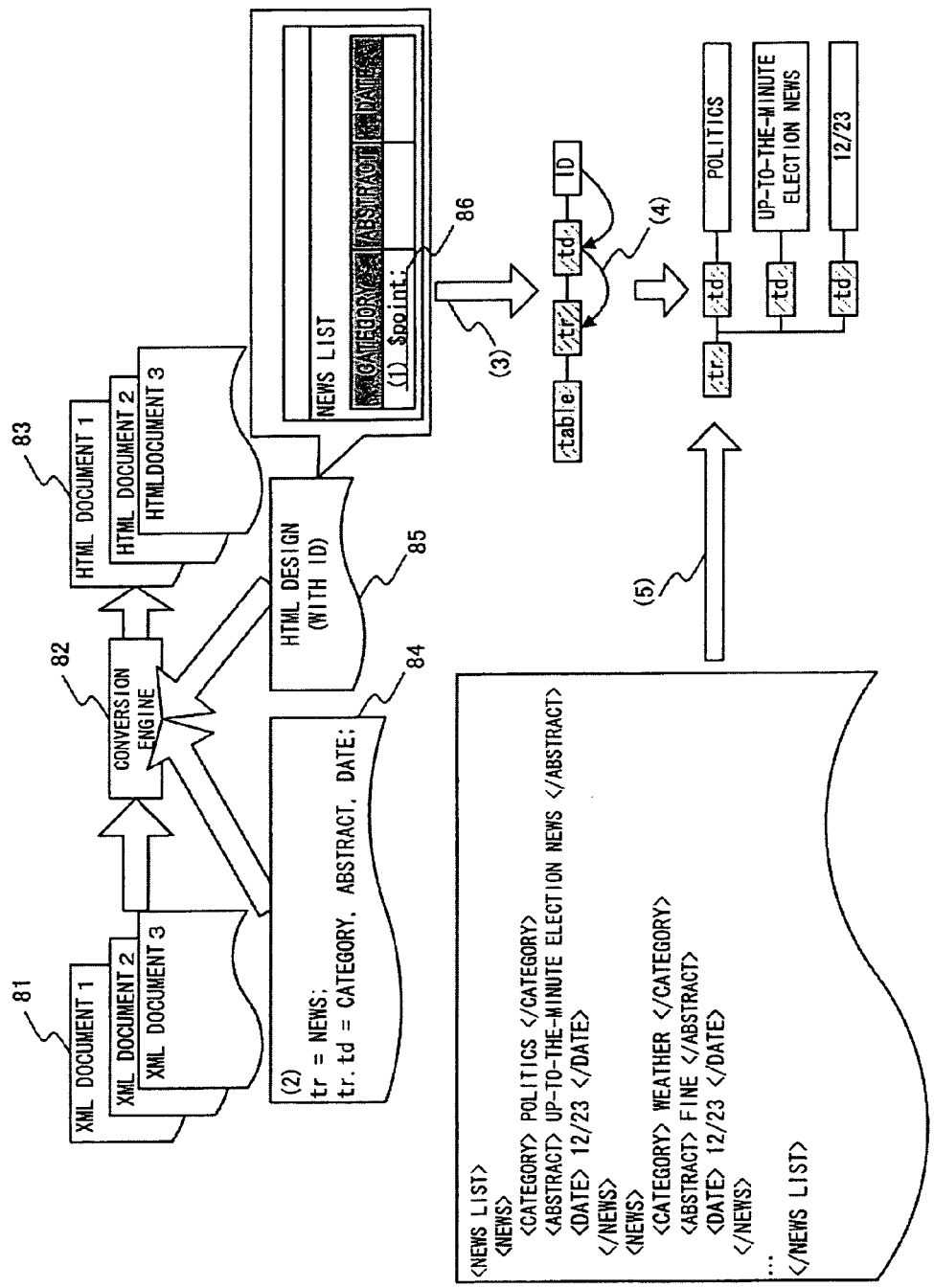
FIG. 8 shows the abstract of the conversion processing by the document conversion and use system according to the present embodiment.

FIG. 8 shows the abstract of the conversion processing by the document conversion and use system according to the present embodiment.

The document conversion and use system according to the present embodiment satisfies the following requirements to solve the above-mentioned problem.

The template (HTML design) edited by an HTML editor can be used as is.

The same repetitive form can be represented by normally configuring data using a plurality of records (unit of information configured by plural pieces of data) to process a structure including repetitive data such as a table, a list, etc.

To satisfy the requirements, the document conversion and use system according to the present embodiment performs conversion processing on the basis of the structure specification portion (element or element content) specified by a user on the template (HTML design), and the correspondence definition described by the user.

A structure can be specified by a user specifying an element or an element content by inserting, for example, a reserved word indicating a point specification into the element content of the element in the HTML design. The insertion of the reserved word can be performed on the HTML editor by writing the reserved word as an element content to the HTML design. The insertion of the reserved word has no influence on the HTML design.

Then, the position of the element described by the correspondence definition is analyzed using the position of the tag including the reserved word as a start point. On the basis of the analysis result, a pointer of a tag of a repetitive structure is extracted, and only the pointers are operated, thereby performing various processes such as insertion etc.

The procedure of the document conversion in the document conversion and use system is practically described below by referring to FIG. 8. The following descriptions (1) through (5) correspond to the parts (1) through (5) shown in FIG. 8.

(1) In HTML design 85, a reserved word 86 ("$point;" in FIG. 8) is assigned to the portion into which data of an XML document 81 is to be inserted.
(2) A user describes in correspondence definition 84 the correspondence of the tags between an HTML document 83 and the XML document 81.
(3) A conversion engine 82 searches the location of the reserved word 86 in the HTML design 85.
(4) The element described in the correspondence definition 84 is searched for in the direction of the parent element from the position of the reserved word 86.
(5) The position of the tag of the element searched for in (4) above is extracted, and the data of the XML document 81 is inserted into the position.

Thus, in the document conversion according to the present embodiment, a template (HTML design) can be used without processing. Therefore, high reusability is guaranteed. Furthermore, since the process of inserting a reserved word can be performed on the HTML editor, thereby having a higher affinity for an HTML editor than the conventional technology.

When the conversion destination structured document is complicated as the HTML design, the conventional technology temporarily describes the template of the conversion destination and processes it. Therefore, the process is laborious, the template is further processed, and the reusability of the template is low. The present embodiment is high in reusability of the template because the template is not processed.

The document conversion and use system according to the present embodiment has an effect of easily converting data structure of a structured document.

In the document conversion and use system according to the present embodiment, the conversion destination template is described while confirming the data using the HTML editor, and the template can be used as is. Then, the structure of each element of the conversion source structured document and the template is specified, and the correspondence definition describing the correspondence is described separately, and the conversion is performed on the basis of the correspondence. Accordingly, since the template is not processed, the high reusability of the template can be guaranteed, and the data structure of a structured document can be easily converted.

In the document conversion and use system according to the present mode for embodying the present invention, the structure can be easily specified.

Figure 9:
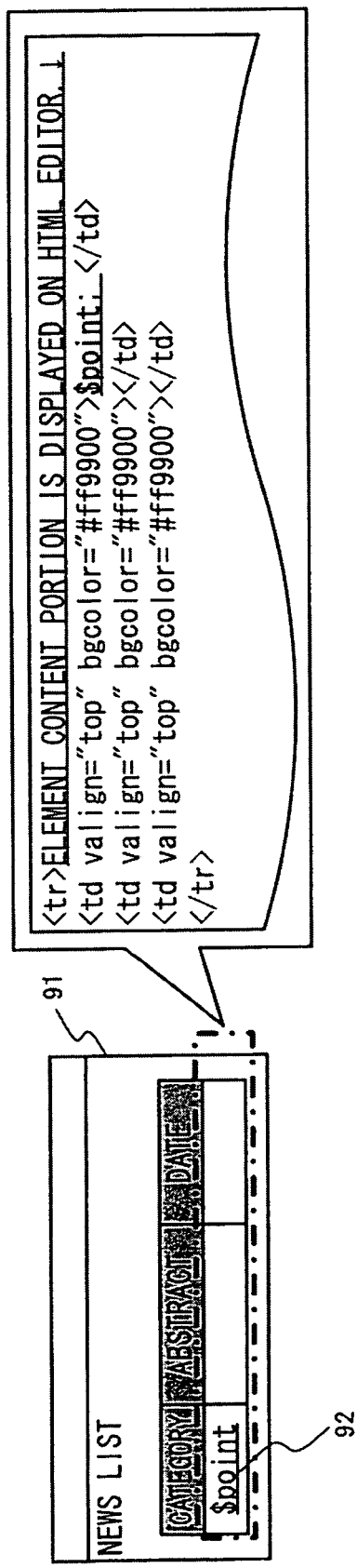
FIG. 9 shows the process of specifying a structure according to the present embodiment.

FIG. 9 shows the process of specifying the structure according to the present embodiment.

The most popular structured document is an HTML. An HTML editor 91 is normally used in editing an HTML. Since the HTML editor 91 cannot show the structure of a tag, it is difficult to specify a structure. Therefore, according to the present embodiment, when an element (structure) is to be specified for a template by the HTML, a reserved word 92 is inserted into the contents of the element on the display screen by the HTML editor 91, thereby specifying the structure on the HTML editor.

In the document conversion and use system according to the present mode for embodying the present invention, the search is performed in the direction of the parent element from the child element. As a result, the structure can be easily specified.

Figure 10:
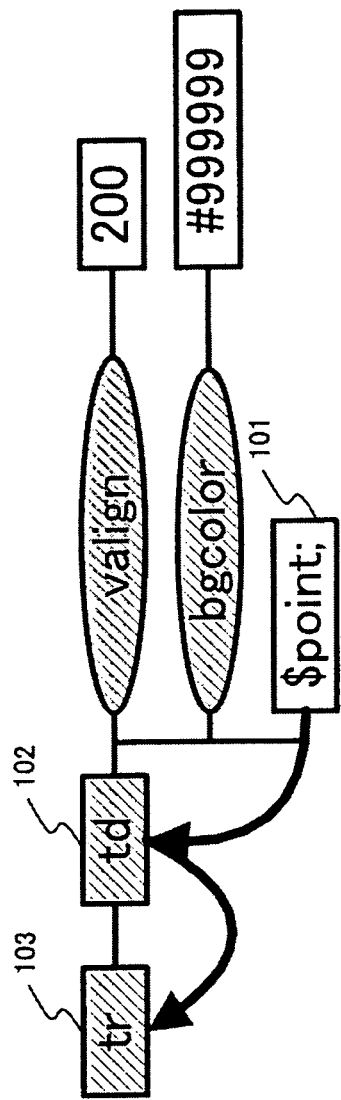
FIG. 10 shows the process of searching a document structure according to the present embodiment.

FIG. 10 shows the process of searching for a document structure according to the present mode for embodying the present invention.

In the present embodiment, when an element specified by the correspondence definition is searched for, elements are traced in the direction of the parent elements 102, 103, etc. from a reserved word 101 as a start point. Thus, the search in the direction of the parent elements enables the structure to be easily specified because the element to be detected can be uniquely determined as compared with the downward search from the root.

In the document conversion and use system according to the present embodiment, the method of converting a document structure can be easily determined on the basis of whether the element to be converted includes only tags or includes also element contents.

The document structure conversion includes element conversion, and conversion of only element content.

Therefore, it is necessary to specify the conversion depending on element or element content only. Accordingly, when an element is converted, its child element is also converted. When only the element content is converted, the reserved word inserted into the conversion destination replaced.

Furthermore, there can be the case where correspondence definition itself refers to a parent-child relationship, the conversion processing is recursively performed on the child elements.

Next, the configuration and the operation of the document conversion and use system according to the present embodiment are described below in more detail.

Figure 11:
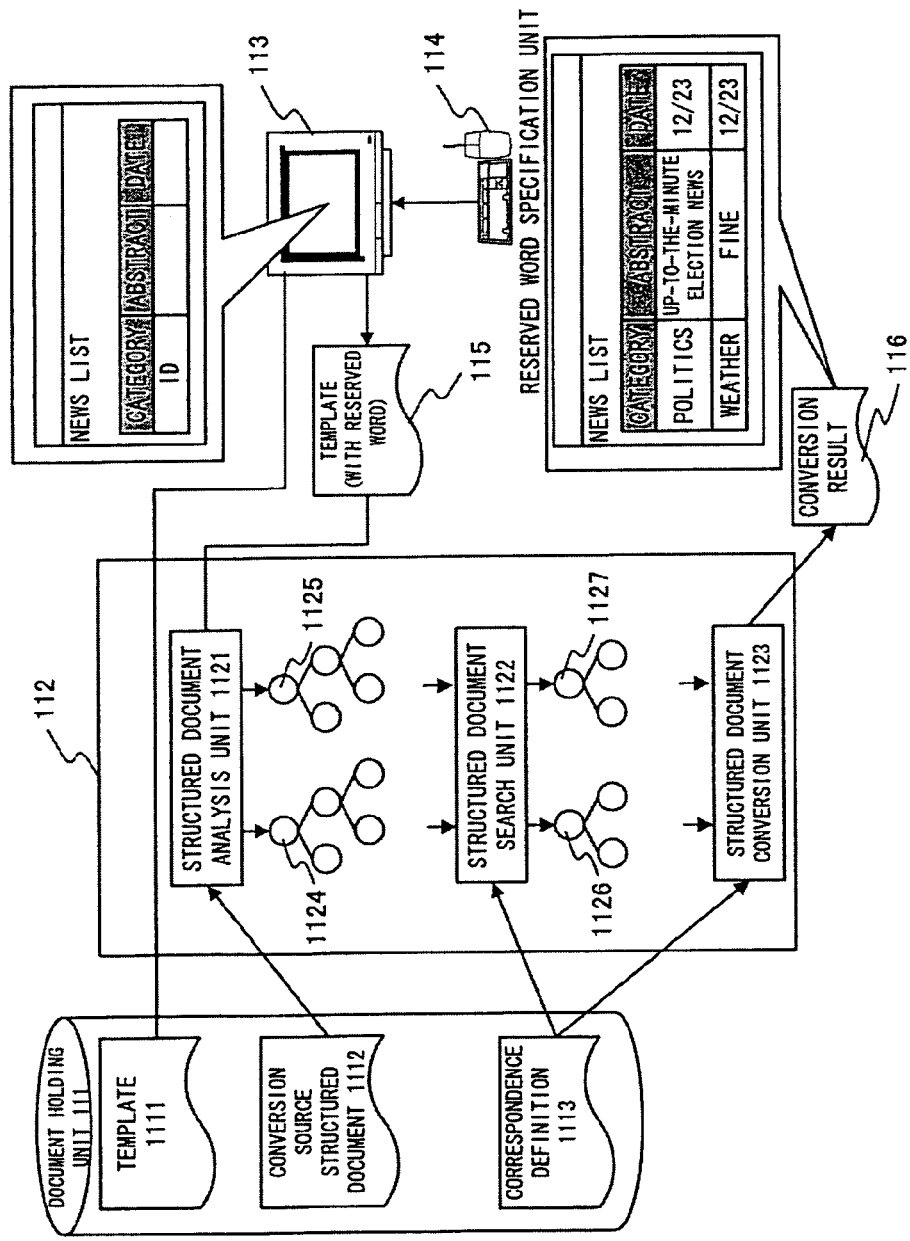
FIG. 11 shows the outline of the entire configuration of the document conversion and use system according to the present embodiment.

FIG. 11 shows the outline of the entire configuration of the document conversion and use system according to the present embodiment.

In FIG. 11, the document conversion and use system includes a document holding unit 111, a conversion engine 112, a template display unit 113, and a reserved word specification unit 114.

The document holding unit 111 stores various types of information for use in the conversion processing performed by the document conversion and use system, and includes the memory of the information processing device, a portable storage medium, and its reader.

In FIG. 11, the document holding unit 111 stores a template 1111 in which the basic structure of a converted structured document is defined (the size, the arrangement, the color, etc. of the table of a converted HTML document are defined using the converted HTML design as element content of a structured document and an attribute value); a conversion source structured document 1112 as a structured document whose data is described in the XML format, and which is to be converted by the present system; and a correspondence definition 1113 storing the correspondence of data structure such as each element, element content, attached drawings, etc. described in the conversion source structured document 1112 and the template 1111 specified by the user.

The conversion engine 112 converts the conversion source structured document 1112 read from the document holding unit 111 and to be converted into a structured document in the HTML etc. for display, and includes a structured document analysis unit 1121, a structured document search unit 1122, and the correspondence definition 1113.

The structured document analysis unit 1121 analyzes the data structure of the conversion source structured document 1112 and a template 115 provided with reserved word, and generates an object in a tree structure. The structured document search unit 1122 searches the tree structure objects 1126 and 1127 on the basis of the relationship between the template 1111 and the tags in the conversion source structured document 1112 set in the correspondence definition 1113. The correspondence definition 1113 inserts the data of the conversion source structured document 1112 in to the HTML design on the basis of the tree structure objects 1126 and 1127 generated by the correspondence definition 1113 and the structured document search unit 1122, and generates an HTML document as a conversion result 116.

The structured document analysis unit 1121, the structured document search unit 1122, and the correspondence definition 1113 can be realized by exclusive hardware or can be read by software by realizing various functions described later by the CPU of the information processing device executing the program in the memory.

The template display unit 113 is formed by a display etc., and presents a user with the template 1111 on the display screen. The reserved word specification unit 114 is formed by a pointing device, a keyboard, etc., and allows a user to specify a reserved word in the template displayed on the template display unit 113, which is described later.

In the document conversion and use system according to the present embodiment, the template 1111 for prescribing the display layout after conversion is generated using the HTML editor etc., and stores it in the document holding unit 111. When a conversion process is performed, the template 1111 is first read, and displayed on the screen of the template display unit 113. While watching the screen, the user operates the reserved word specification unit 114 and specifies a reserved word on the displayed template.

The template 115 on which the reserved word is specified is input to the structured document analysis unit 1121. The structured document analysis unit 1121 reads from the document holding unit 111 the conversion source structured document 1112 to be converted, converts it into a tree structure object 1124, and outputs the result to the structured document search unit 1122. When the template 115 in which a reserved word is specified is input from the template display unit 113, it is converted into a tree structure object, and outputs the result to the structured document search unit 1122.

Also the user defines the correspondence between the tag in the conversion source structured document 1112 and the tag in the template 1111 as the correspondence definition 1113.

The structured document search unit 1122 performs search of a document on the basis of the position of the reserved word specified by the user on the tree structure object 1124 of the conversion source structured document 1112 and a tree structure object 1125 of the template 115 in which the reserved word is specified from the structured document analysis unit 1121, generates the tree structure objects 1126 and tree structure object 1127 defined as associated, and output the result to the correspondence definition 1113, which is described later.

The template display unit 113 inserts the tree structure object 1126 of the conversion source structured document defined as associated into the tree structure object 1127 of the template defined as associated, and generates an HTML document as the conversion result 116.

Next, each component of the document conversion and use system shown in FIG. 11 and contents of its processing operation are described below in detail by referring to a practical example.

Figure 12:
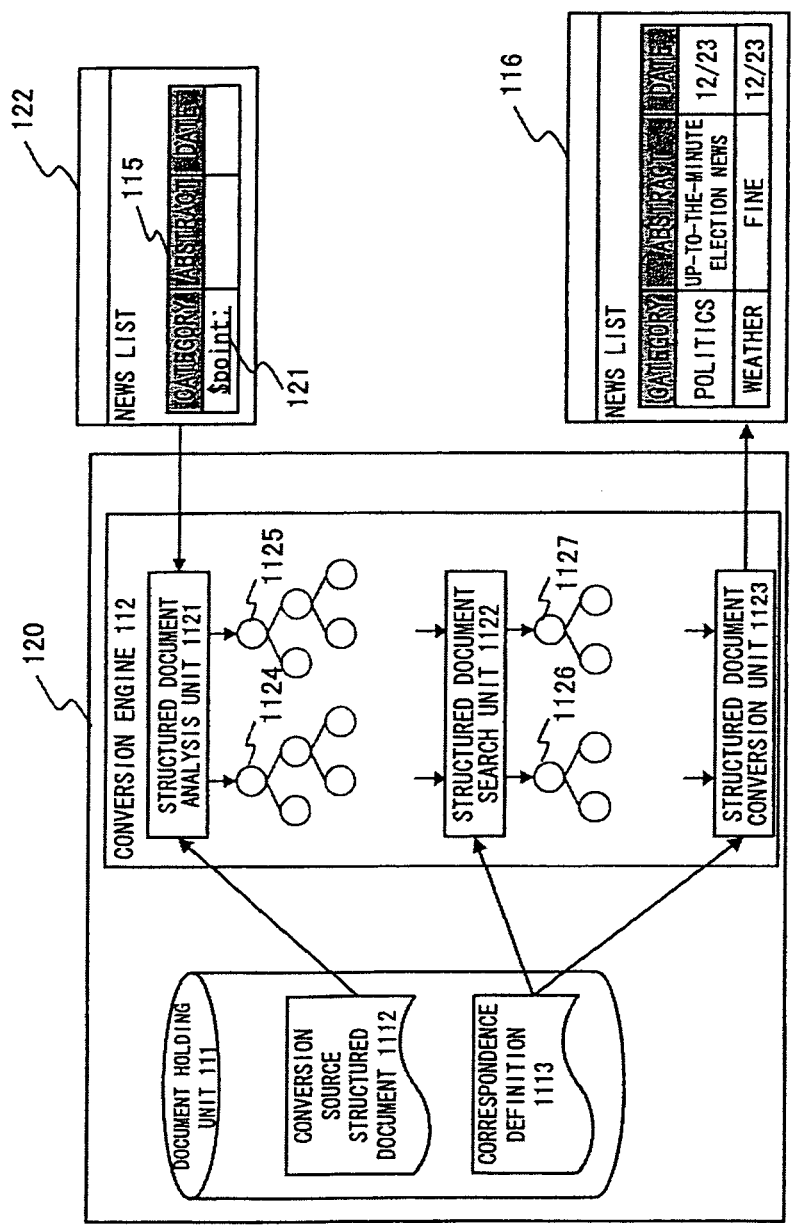
FIG. 12 shows a practical example of converting a document by the document conversion and use system.
Figure 14:
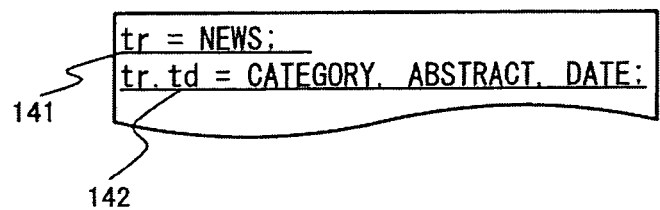
FIG. 14 shows an example of correspondence definition.

FIG. 12 shows a practical example of the document conversion by the document conversion and use system shown in FIG. 11. FIG. 13 shows an example of a conversion source structured document, and FIG. 14 shows an example of correspondence definition. In FIG. 12, the components basically the same as those shown in FIG. 11 are assigned the same reference numerals.

In FIG. 12, an information processing device 120 is provided with the document holding unit 111 and the conversion engine 112. An HTML editor 122 for holding and displaying the template 115 can be the function of the information processing device 120 or separate equipment such as a user terminal etc. connected to the information processing device 120.

When a user inputs the reserved word 121 on the template 115 displayed by an HTML editor 121 at the position into which the element content of the conversion source structured document 1112 is to be inserted, the template 115 provided with the reserved word is input to the structured document analysis unit 1121. In FIG. 12, the user inputs "$point;" as the HTML editor 121 to the position below the item category on the display screen displaying the template.

Then, the user defines the correspondence definition 1113.

The user defines in the correspondence definition 1113 the correspondence of the tags between the template 1111 in the conversion source structured document 1112. The definition of the correspondence is performed by associating the element name of the conversion source structured document 1112 with the reserved word in the template 1111.

FIG. 14 shows an example of the configuration of the correspondence definition 1113.

In the example shown in FIG. 14, the conversion source structured document 1112 shown in FIG. 11 is to be output as a table as shown in FIG. 12 as the conversion result 116, definition 141 defines the <news> tag of the conversion source structured document 1112 to correspond to the reserved word <tr> tag indicating one line of the table in the template 1111. As the child element of the <news> tag is to be output to each line of the table, definition 142 defines <category>, , and <date> tags as child elements of the <news> tag of the conversion source structured document 1112 to correspond to the <td> tag having the <tr> tag in the template 1111 as a parent element.

In the correspondence definition shown in FIG. 14, "." represents the relationship between the parent element and the child element, and "tr.td" of the definition 142 represents the <td> tag having the <tr> tag as a parent element.

The structured document analysis unit 1121 analyzes the data structure of the conversion source structured document 1112 and the template 115 provided with the reserved word, and generates the tree structure object 1124 and the tree structure object 1125 indicating the parent-child relationship on the basis of the relationship of each tag.

Figure 15:
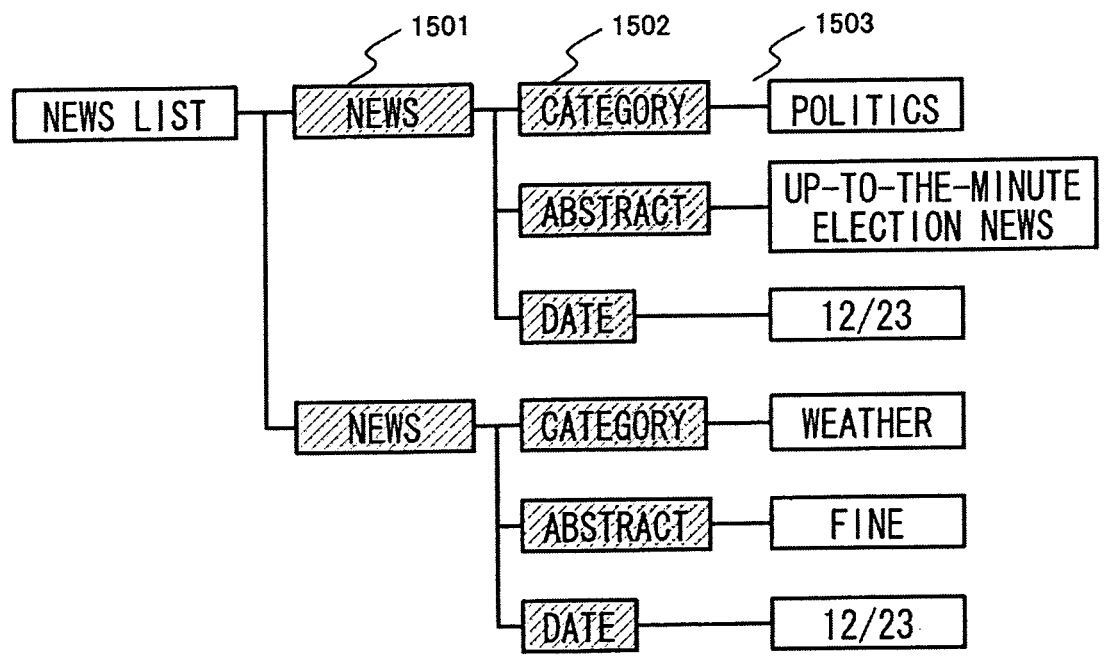
FIG. 15 shows an example of a tree structure object of a conversion source structured document according to the first embodiment.

FIG. 15 shows an example of the tree structure object 1124 of the conversion source structured document.

FIG. 15 shows a part of the case where the conversion source structured document shown in FIG. 13 is a tree structure object.

From the tree structure object shown in FIG. 15, it is certain that the conversion source structured document shown in FIG. 13 has two elements <news>, each element <news> has elements <category> , and <date> as child elements, the upper child elements <category>, , and <date> have "politics", "up-to-the-minute election news", and "12/23" as element contents, and the lower child elements <category>, , and <date> have "weather", "fine", and "12/23" as element contents.

FIG. 16 shows an example of the tree structure object 1125 of the template 115.

In FIG. 16, the tags are represented by the shaded squares, the attributes are represented by the ovals, and the element contents are represented by non-shaded squares.

FIG. 16 shows that the reserved word 121 is arranged at the portion where data is defined in the line forming part of the table of the template.

The structured document search unit 1122 searches for the position of the reserved word 121 the tree structure object 1125 of the template as shown in FIG. 16.

Then, the structured document search unit 1122 searches for an element described in the correspondence definition 1113 the tree structure object 1125 of the template. The search of the element is performed in the direction of the parent element from the position of the reserved word 121 as a start point.

The structured document search unit 1122 sequentially searches for the parent element, a parent element of the parent element using the position of the reserved word 121 as a start point. During the search, if the element ("td" in the present example) first described in the correspondence definition 1113 is detected, the element ("tr" in the embodiment) described in another correspondence definition is searched for, the corresponding portion is extracted from the tree structure object 1125 of the template, and the tree structure object 1127 of the template described in the correspondence definition is generated.

The structured document search unit 1122 sequentially searches for the element described in the correspondence definition 1113 from the root of the tree structure object 1124 of the conversion source structured document 1122, detects the element described in the correspondence definition 1113, and generates the tree structure object 1126 of the structured document search unit 1122 described in the correspondence definition.

If the element described in the correspondence definition 1113 is detected in the search in the tree structure object 1124 of the conversion source structured document, it is certain that the element has a child element, and a parent element is defined as an element of the template 1111 associated in the correspondence definition, then a structured document conversion unit 1123 copies the tree structure object 1127 of the template described in the correspondence definition, and inserts the tree structure object 1127 into the position next to the position where it is extracted. For example, if the element detected in FIG. 13 is a <news> 1501 having a child element <category> 1302, then the copied tree structure object 1127 is inserted into the position next to <tr> 1602 below <table> 1601.

If the element described in the correspondence definition 1113 is detected in the search in the tree structure object 1124 of the conversion source structured document, the element has only an element content, and the element of the template associated in the correspondence definition has no child element, the structured document conversion unit 1123 determines that the element is an end element content, considers that the reserved word 121 is described at the corresponding position, and replaces the element content with the reserved word 121. For example, when the element retrieved in FIG. 15 is an element <category> 1502 having only an element content "politics" 1503 as a child element, the reserved word 121 is replaced with the element content "politics".

If the search of the tree structure object 1124 by the structured document search unit 1122 and the process by the structured document conversion unit 1123 on the retrieved element are performed on all elements in the conversion source structured document 1112, then the conversion engine 120 terminates the process, and outputs the HTML document generated as the conversion result 116.

Thus, the conversion of the conversion source structured document 1112 is performed by the document conversion and use system according to the present embodiment. In the conversion, the converting process can be performed only by entering the reserved word 121 in the template 1111 from the defined HTML editor. Thus, the data and the design can be separately changed and managed.

The tree structure objects 1124, 1125, 1126, and 1127 described above can be, for example, a DOM (Document Object Model), etc. If each element can be traced in a tree structure, a similar effect can be obtained on other objects.

FIG. 17 is a flowchart of the process by the conversion engine according to the first embodiment. The process shown in FIG. 17 is realized by exclusive hardware or the CPU executing the program in memory.

When the process is started in FIG. 17, first in step S1, the template 1111 is displayed on the template display unit 113, and the reserved word specification unit 114 allows a user to input on the display screen a reserved word ("$point;") at a position where the conversion source structured document is to be inserted.

Next, in step S2, the conversion engine allows the user to input the correspondence definition of the corresponding portions between the conversion source structured document and the template, and store the definition in the document holding unit 111.

Then, the retrieval engine reads the conversion source structured document 1112 and the template 115 provided with a reserved word from the document holding unit 111. In step S3, the retrieval engine makes the structured document analysis unit 1121 analyze the document structure of the conversion source structured document 1112 and the template 115 provided with the reserved word, and generates the tree structure object 1124 of the conversion source structured document and the tree structure object 1125 of the template.

In step S4, the structured document search unit 1122 searches the tree structure object 1125 of the template for the reserved word 121, and checks the position.

The structured document search unit 1122 also searches the tree structure object 1125 of the template for an element described in the correspondence definition 1113 in step S5. The search is performed in the direction of a parent element from the position, as a start point, of the reserved word 121 retrieved in step S4. When an element described in the correspondence definition is first detected, an element described as another correspondence definition is retrieved.

Next, the structured document search unit 1122 sequentially searches the tree structure object 1124 of the conversion source structured document for an element described in the template display unit 113 from the root in step S6.

If no element is detected as a result (NO in step S7), then control is passed to step S13.

If an element defined in the correspondence definition 1113 is detected in step S7 (YES in step S7), then it is determined whether or not the detected element has a child element, and the element in the corresponding template has a defined parent element in step S8. If the detected element has a child element and the element in the corresponding template has a defined parent element (YES in step S8) in step S8, then it copies the tree structure object 1127 of the template, and inserts the tree structure object 1127 into the position (the portion 1603 shown in FIG. 16) next to the position where it is extracted in step S9, thereby passing control to step S13.

If the retrieved element does not satisfy the condition in step S8 (NO in step S8), then it is determined in step S10 whether or not the retrieved element has only an element content, and whether or not the element in the corresponding template has no child element. If YES (YES in step S10), it is considered that a reserved word is described as a content of an end element, the element content is replaced with the reserved word in step S1, and control is passed to step S13. If it is determined in step S10 that the retrieved element does not satisfy the condition in step S10 (NO in step S10), then it is determined that wrong correspondence has been detected, and the process is terminated due to an error in step S12.

In step S13, it is determined whether or not the search has been performed on all elements defined in the correspondence definition 1113. If the search has not been performed on all elements (NO in step S13), then control is returned to step S6 and the processes in steps S6 through S13 are repeated until the search is performed on all elements.

If the search is performed on all elements (YES in step S13), then the conversion result is output, thereby terminating the process in step S14.

If the detected element has a child element and the child element has another element before conversion defined in the correspondence definition as a child element in step S7, the processes in steps S8 to S12 are similarly performed on the child element of the above-mentioned child element.

In the process according to the first mode for embodying the present invention, the conversion processing can be easily performed only by entering a reserved word in the template displayed on the HTML editor. As a result, the data and the design can be separately managed and changed.

Since a reserved word can be assigned to a template on the HTML editor, the process can be performed while confirming the process on the display of the HTML editor.

Furthermore, since the template is not processed, the template has high reusability, and the data structure of a structured document can be easily converted.

Since the search is performed in the direction of the parent element from the position of the reserved word, the structure can be easily specified.

The second example of the conversion using the document conversion and use system according to the present embodiment is described below.

FIG. 18 shows a conversion source structured document to be converted according to the second embodiment. FIG. 19 shows a template used in the second mode for embodying the present invention.

In the second embodiment, the conversion source structured document shown in FIG. 18 is converted into an HTML document using the template shown in FIG. 19.

In FIG. 19, reserved words "ID1" 1901 and "ID2" 1902 are inserted, and the user inputs the correspondence definition for each word.

Figure 21:
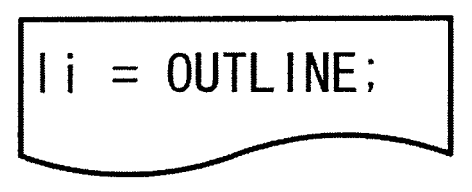

FIG. 20 shows the correspondence definition of the "ID1" 1901 and FIG. 21 shows the correspondence definition of the "ID2" 1902.

In FIG. 20, the of the conversion source structured document is associated with the tag <li> of the template. In FIG. 21, <outline> of the conversion source structured document is associated with the tag "li" of the template. When the search is performed from the reserved word "ID1" 1901, the document conversion and use system associates with "li". When the search is performed from the reserved word "ID2" 1902, the document conversion and use system associates <outline> with "li".

Figure 22:
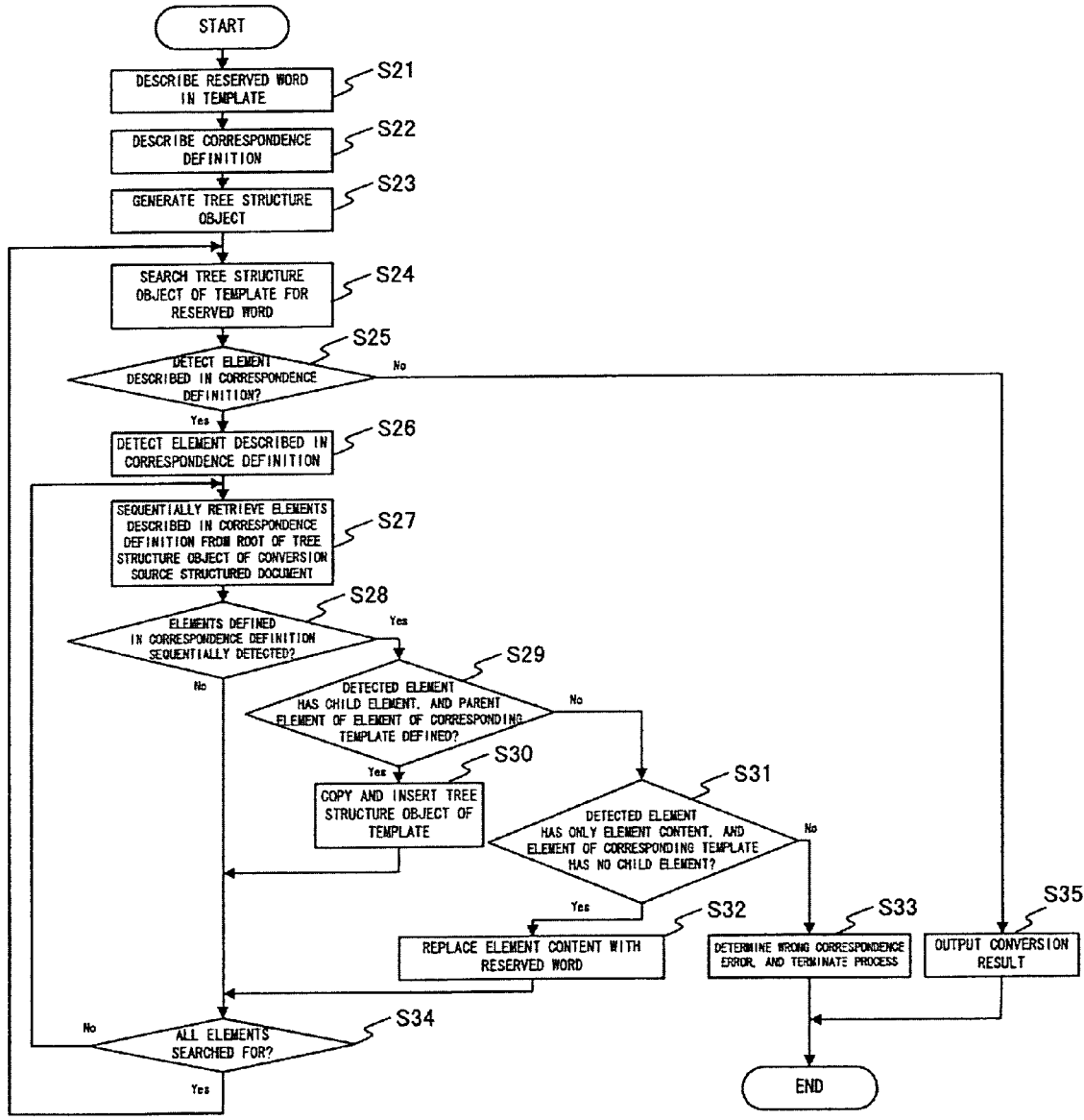
FIG. 22 is a flowchart showing the operating process of the document conversion and use system according to the second embodiment.

FIG. 22 is a flowchart of the operating process of the document conversion and use system according to the second embodiment.

Described below by referring to the flowchart in FIG. 22 is the operation of the document conversion and use system performed when the conversion source structured document shown in FIG. 18 is converted using the template shown in FIG. 19 and the correspondence definition shown in FIGS. 20 and 21.

The configuration of the document conversion and use system according to the second embodiment is basically the same as the configuration according to the first embodiment shown in FIG. 11 except that a plurality of reserved words and a plurality of correspondence definition 1113 are used in the second embodiment.

When the process is started as shown in FIG. 22, the template 1111 is displayed on the template display unit 113 in step S21, and the user is prompted to input the reserved words (ID1, ID2) at the position into which the conversion source structured document is to be inserted on the display screen through the reserved word specification unit 114.

Next, in step S22, the conversion engine prompts the user to input the corresponding portions between the conversion source structured document and the template with the correspondence definition as shown in FIGS. 20 and 21 associated with the reserved words ID1 and ID2, and the input data is stored in the document holding unit 111.

Then, the retrieval engine reads the conversion source structured document 1112 from the document holding unit 111, and analyzes the document structures of the conversion source structured document 1112 and the template 115 with a reserved word using the structured document analysis unit 1121 in step S23, and generates the tree structure object 1124 of the conversion source structured document and the tree structure object 1125 of the template.

FIG. 23 shows the generated tree structure object 1124 of the conversion source structured document. FIG. 24 shows the tree structure object 1125 of the template.

The tree structure objects shown in FIGS. 23 and 24 include the specification of a plurality of reserved words in the tree structure object 1125 of the template shown in FIG. 24, and are basically the same as those according to the first embodiment.

Next, the document conversion and use system searches the tree structure object 1125 of the template for a reserved word using the structured document search unit 1122, and checks the position in step S24. If the reserved word is detected (YES in step S25) as a result, in step S26, the structured document search unit 1122 searches the tree structure object 1125 of the template for the element described in the correspondence definition 1113 in the direction of the parent element from the position of the reserved word detected in step S25 as a start point, and detects the element described in the correspondence definition corresponding to the reserved word detected in step S24.

Next, the structured document search unit 1122 sequentially searches the tree structure object 1124 of the conversion source structured document from the root in step S27, and detects the element described in the correspondence definition 1113 used in step S26.

If the element is not detected as a result (NO in step S28), control is passed to step S29.

If the element defined in the correspondence definition 1113 is detected in step S28 (YES in step S28), then in step S29 it is determined whether or not the detected element has a child element, and the element of the corresponding template has a defined parent element. If the detected element has a child element, and the element of the corresponding template has a defined parent element (YES in step S29), then, in step S30, the tree structure object 1127 of the template is copied, and the tree structure object 1127 of the template 1111 is inserted into the position next to the position where it is extracted, and then control is passed to step S34.

If the detected element does not satisfy the condition in step S29 (NO in step S29), then in step S31, it is determined whether or not the detected element has only an element content, and the element of the corresponding template has no child element. If YES (YES in step S31), it is considered that a reserved word is described as an element content at the end, the reserved word replaces the element content in step S32, and control is passed to step S34. If the detected element does not satisfy the condition of step S31 (NO in step S31), then in step S33, wrong correspondence is assigned in step S33, thereby recognizing an error and terminating the process.

In step S34, it is determined whether or not the search has been performed on all elements defined in the correspondence definition 1113. If the search has not been performed on all elements (NO in step S34), control is returned to step S26 and the processes in steps S27 through S34 are repeated until the search is performed on all elements.

If the search has been performed on all elements (YES in step S34), control is returned to step S24.

In step S24, a new reserved word is retrieved from a tree structure object 925. If a new reserved word is found as a result (YES in step S25), the processes in and after step S26 are performed on the reserved word. If no reserved word is newly detected in step S25 (NO in step S25), the conversion result is output in step S35, thereby terminating the process.

In step S28, if the detected element has a child element, and the child element has another element before conversion defined in the correspondence definition as a child element, the processes in steps S29 through S33 are similarly performed on a child element of the child element.

Figure 25:
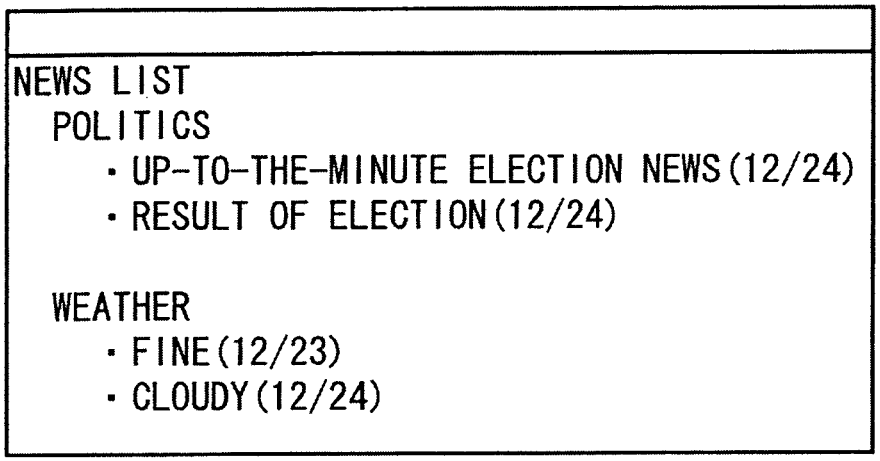
FIG. 25 shows a conversion result according to the second embodiment.

FIG. 25 shows a conversion result according to the second mode for embodying the present invention.

In FIG. 25, in the respective positions specified by two reserved words, a list into which the element contents corresponding to the related conversion source structured documents are inserted is generated.

Thus, according to the second mode for embodying the present invention, a reserved word can be specified in a plurality of positions of the template by setting a plurality of reserved words, and the conversion can be made using plural correspondences.

Figure 26:
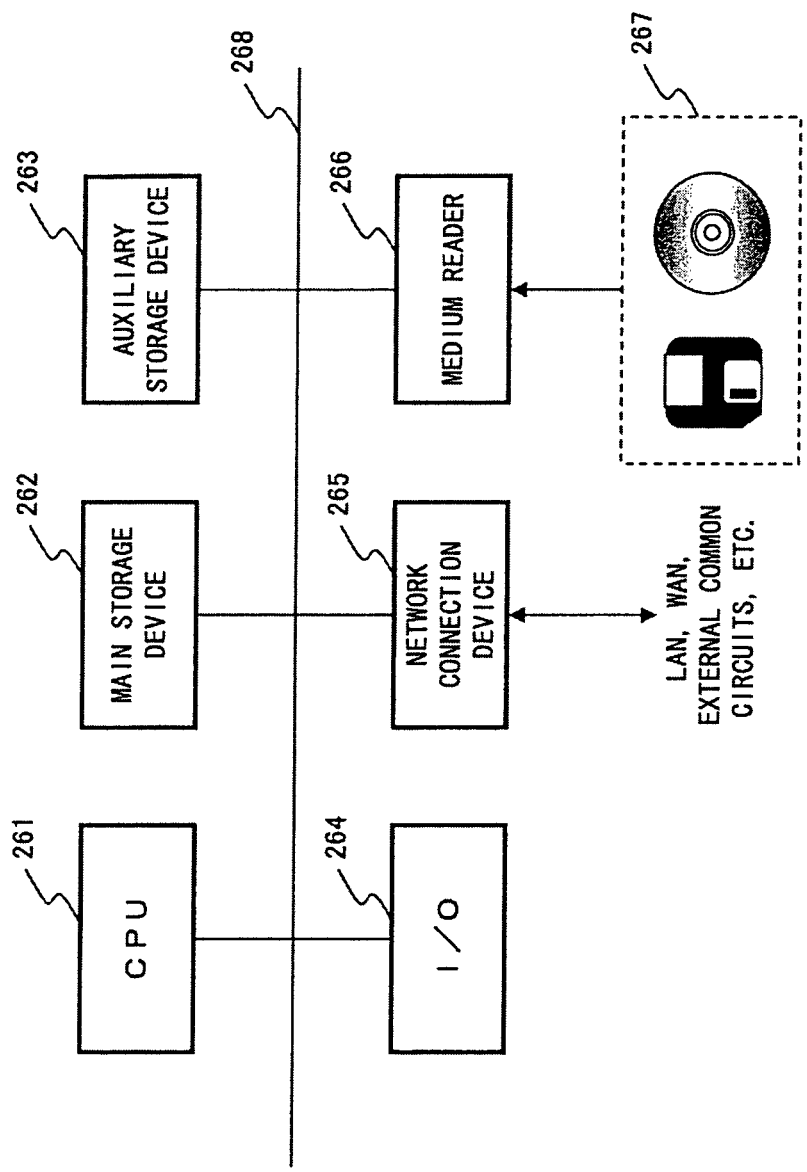
FIG. 26 shows a system environment of the information processing device.

FIG. 26 shows the environment of the information processing device 120 shown in FIG. 12.

The information processing device 120 in which the document conversion and use system according to the present embodiment is implemented includes, as shown in FIG. 26, a CPU 261, a main storage device 262, an auxiliary storage device 263 such as a hard disk etc., an input/output device (I/O) 264 such as a display, a keyboard, etc., a network connection device 265 such as a modem etc., and a medium reader 266 for reading the stored contents from a portable storage medium such as a disk, a magnetic tape, etc. These components are interconnected via a bus 267.

In the information processing system shown in FIG. 12, the program and data stored on a magnetic tape, a storage medium 268 such as a magnetic tape, a flexible disk, CD-ROM, MO, etc. are read by the medium reader 266, and downloaded into the main storage device 262 or the auxiliary storage device 263. On the basis of the program and data, the CPU 261 realizes the function of the above-mentioned document conversion and use system.

In the computer system shown in FIG. 26, application software can be converted using the storage medium 268 such as a flexible disk etc. Thus, the present invention is not limited to a document conversion and use system or a document converting method, but can also be configured by a computer-readable storage medium 268 used to direct a computer to perform the functions of the modes for embodying the present invention when it is used in a computer.

Figure 27:
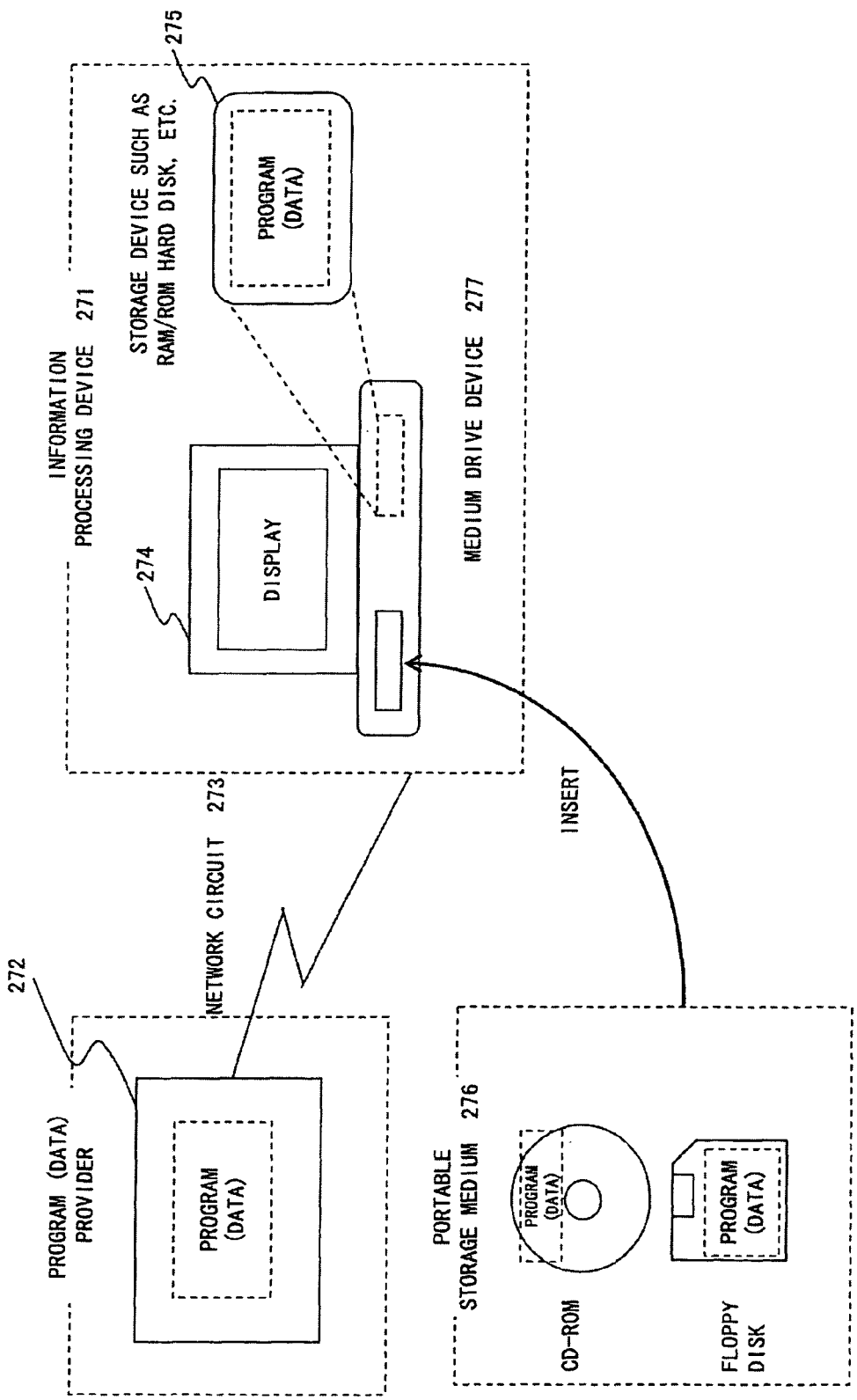
FIG. 27 shows an example of a recording medium.

In this case, a "storage medium" includes a portable storage medium 276 attachable to and removable from a medium drive device 277 such as CD-ROM, flexible disk (or MO, DVD, removable hard disk, etc.), etc., a storage unit (database etc.) 272 in an external device (server etc.) for transmission through a network circuit 273, memory (RAM or hard disk etc.) 275 in a body 274 of an information processing device 271, etc. as shown in FIG. 27. A program stored in the portable storage medium 276 and the storage unit (database etc.) 272 is loaded into the memory (RAM or hard disk etc.) 275 in the body 274, and then executed.

In addition to the storage medium such as the above-mentioned CD-ROM, DVD-ROM, etc., the present invention can be realized using various large capacity storage media, for example, a next-generation optical disk storage medium using a blue laser such as Blu-ray Disk (registered trademark), AOD (Advanced Optical Disc), etc., an HD-DVD9 using a red laser, Blue Laser DVD using a blue purple laser, etc.

According to the present invention, when a structured document is converted into another data structure, converted-to design (data structure) can be separately generated, and the conversion can be performed almost without processing the design. Therefore, the data and the design can be separately managed and reused.

In the above-mentioned examples, an XML document is converted into an HTML document, but the conversion by the document conversion and use system according to the present embodiment is not limited to this application, but the conversion can be performed between other structured documents such as from an SGML document to an HTML document, etc.

What is claimed is:

1. An information processing device implementing a document conversion and use system which converts a first structured document into a second structured document different in structure from the first structured document, comprising:

a template storage device configured to store a template indicating the structure of the second structured document and described in a same language with the second structured document; and a processing unit including a structure specification unit configured to read the template from the template storage device, display a design represented by the read template on a screen of a display device, and specify an element or an element content configuring the template in the displayed design;

a correspondence definition specification unit configured to define a correspondence definition indicating correspondence between an element in the first structured document and an element in the template by corresponding a tag of a element in the first structured document with a position of the specified element or element content in the displayed design;

a structured document analysis unit configured to convert the template and the first structured document into tree structure objects, respectively;

a search unit configured to search the element or the element content specified by the structure specification unit from the tree structure object of the template, sequentially search the element described in the correspondence definition from the searched element or element content in the tree structure object of the template as a start point, generate a tree structure object of the template which comprises the element sequentially-searched element, and search an element described in the correspondence definition from the tree structure object of the first structured document; and a conversion processing unit configured to, when the element detected by searching from the tree structure object of the first structured document having a child element and a corresponding element in the template having a parent element defined by the correspondence definition specification unit, enter the generated tree structure of the template into the tree object of the template according to the number of child elements, and when the element detected by searching from the tree structure object of the first structured document having only an element content and a corresponding element in the template having no child element, replace the element content of the detected element with the specified element content in the template.

2. The information processing device implementing the document conversion and use system according to claim 1, wherein
the structure specification unit displays the template read from the template storage device, and allows a user to specify on a display screen an element or an element content configuring the template.

3. The information processing device implementing the document conversion and use system according to claim 2, wherein
the structure specification unit allows the user to input on the display screen a reserved word, thereby specifying an element or an element content configuring the template.

4. The information processing device implementing the document conversion and use system according to claim 1, wherein
the search unit searches a structure in a direction of a parent element from a position of an element or an element content specified by the structure specification unit.

5. The information processing device implementing the document conversion and use system according to claim 1, wherein
when the element detected by searching from the tree structure object of the first structured document has a child element and the child element has as a child element and another element before conversion which is defined in the correspondence definition, the conversion processing unit perform the entering process or the replacing process for the detected element.

6. The information processing device implementing the document conversion and use system according to claim 1, wherein
the first structured document is an XML document, and the second structured document is an HTML document.

7. A document converting method for converting a first structured document to a second structured document different in structure from the first structured document, comprising:
reading a template indicating a structure of the second structured document and described in a same language with the second structured document;
displaying a design represented by the read template on a screen of a display device;
allowing a user to specify an element or an element content configuring the template in the displayed design;
allowing the user to define a correspondence definition indicating correspondence between an element in the first structured document and an element in the template by corresponding a tag of a element in the first structured document with a position of the specified element or element content in the displayed design;
converting the template and the first structured document into tree structure objects, respectively;
searching the specified element or the specified element content from the tree structure object of the template, sequentially searching the element described in the correspondence definition from the searched element or element content in the tree structure object of the template as a start point, and generating a tree structure object of the template which comprises the element sequentially-searched element;
searching an element described in the correspondence definition from the tree structure object of the first structured document; and
entering, when the element detected by searching from the tree structure object of the first structured document having a child element and a corresponding element in the template having a defined parent element, the generated tree structure of the template into the tree object of the template according to the number of child elements, and replacing, when the element detected by searching from the tree structure object of the first structured document having only an element content and a corresponding element in the template having no child element, the element content of the detected element with the specified element content in the template.

8. The document converting method according to claim 7, wherein
displaying includes displaying the template read from the template storage device, and allowing the user to specify on a display screen an element or an element content configuring the template.

9. The document converting method according to claim 8, wherein
allowing includes allowing the user to input on the display screen a reserved word, thereby specifying an element or an element content configuring the template.

10. The document converting method according to claim 7, wherein
searching includes searching a structure in a direction of a parent element from a position of an specified element or an specified element content specified.

11. A portable storage medium readable by an information processing device for converting a first structured document to a second structured document different in structure from the first structured document, comprising:

reading a template indicating a structure of the second structured document and described in a same language with the second structured document;

displaying a design represented by the read template on a screen of a display device;

allowing a user to specify an element or an element content configuring the template in the displayed design;

allowing the user to define a correspondence definition indicating correspondence between an element in the first structured document and an element in the template by corresponding a tag of a element in the first structured document with a position of the specified element or element content in the displayed design;

converting the template and the first structured document into tree structure objects, respectively;

searching the specified element or the specified element content from the tree structure object of the template, sequentially searching the element described in the correspondence definition from the searched element or element content in the tree structure object of the template as a start point, and generating a tree structure object of the template which comprises the element sequentially-searched element;

searching an element described in the correspondence definition from the tree structure object of the first structured document; and entering, when the element detected by searching from the tree structure object of the first structured document having a child element and a corresponding element in the template having a defined parent element, the generated tree structure of the template into the tree object of the template according to the number of child elements, and replacing, when the element detected by searching from the tree structure object of the first structured document having only an element content and a corresponding element in the template having no child element, the element content of the detected element with the specified element content in the template.

12. The portable storage medium according to claim 11, wherein displaying includes displaying the template read from the template storage device, and allowing the user to specify on a display screen an element or an element content configuring the template.

13. The portable storage medium according to claim 12, wherein allowing includes allowing the user to input on the display screen a reserved word, thereby specifying an element or an element content configuring the template.

14. The portable storage medium according to claim 11, wherein searching includes searching a structure in a direction of a parent element from a position of an specified element or an specified element content specified.

* * * * *